June 20, 1961 L. J. NOVAK 2,989,421
GAS PLATING OF INERT COMPOUNDS ON QUARTZ CRUCIBLES
Filed June 18, 1957
Fig. 1
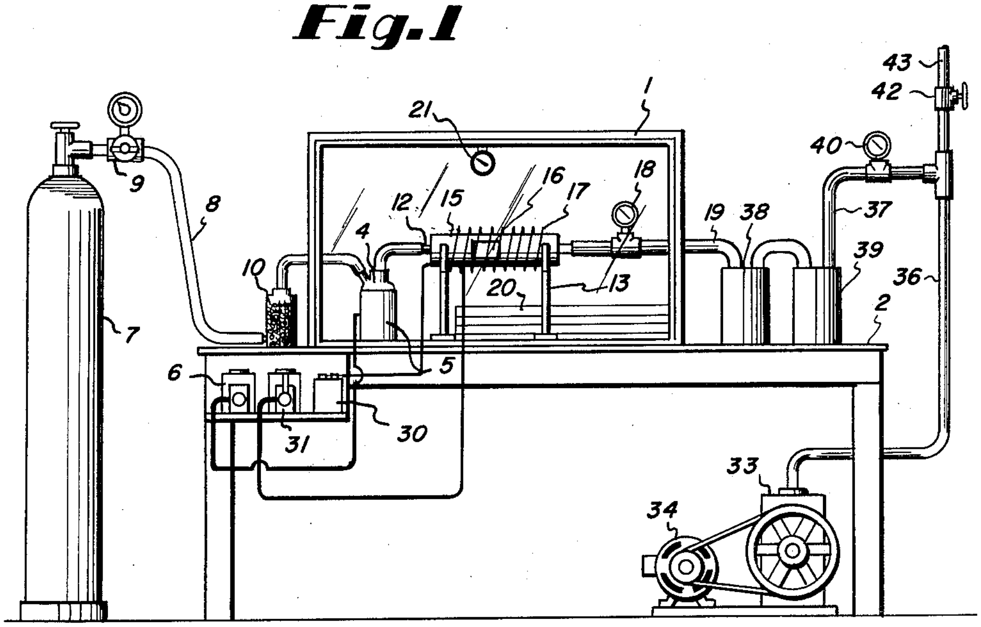
Fig. 2
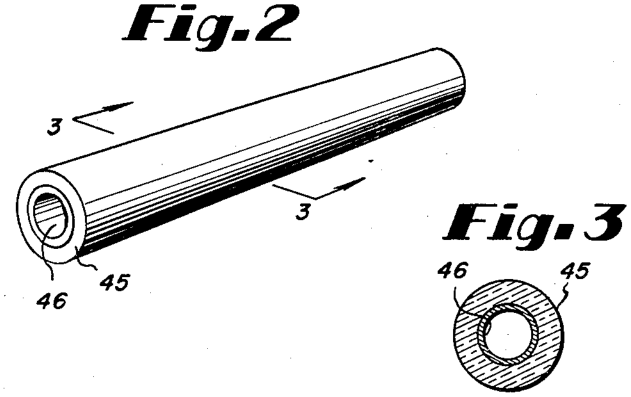
Fig. 2, Fig. 3
INVENTOR
LEO J. NOVAK
BY Toulmin & Toulmin
ATTORNEYS 2,989,421
Patented June 20, 1961

2,989,421

GAS PLATING OF INERT COMPOUNDS ON QUARTZ CRUCIBLES

Leo J. Novak, Dayton, Ohio, assignor, by mesne assignments, to Union Carbide Corporation, New York, N.Y., a corporation of New York Filed June 18, 1957, Ser. No. 666,349
2 Claims. (Cl. 117—106)

This invention relates to a method and apparatus for depositing refractory films and coatings on substrates. The invention more particularly appertains to gas plating of alumina films on silica substrates.

While the invention will be described and illustrated with particular reference to alumina, it will be understood that the invention is also applicable to the gas plating of similar inert refractory type compounds, e.g., zirconia, thoria, metal carbides, nitrides and borides.

A principal object of the invention is to provide a method and apparatus for gas plating refractory films on quartz or silica substrates.

Another object is to provide a process and apparatus for coating the inside of quartz crucibles with alumina. Such alumina-coated crucibles are useful in the handling of semi-conductor materials.

In gas plating, a volatile organic metal containing compound is passed as a gas over the heated subtrate to be plated. The heated substrate causes the organic metal containing compound to decompose and to deposit, as desired, a metal, an oxide, or for example a carbide. The nature of the deposit is determined by the type of volatile metal containing compound and the conditions under which it is thermally decomposed.

The substrate can be any solid article that will stand the temperature required for the time needed to thermally decompose the particular metal containing compound. Heating of the substrate to be plated can be accomplished by one or more of the following: induction, resistance, dielectric, furnace, convection, or infrared heating.

Ideally, the metal containing compound for gas plating should have the following properties:

(*a*) Volatility below its decomposition temperature;
(*b*) Decomposition temperature above its boiling point but low enough to plate at a temperature which does not thermally alter the substrate;
(*c*) Chemical kinetics of decomposition which yields the desired product; and
(*d*) Available from commercial sources.

For gas plating alumina a restricted number of compounds have the proper combination of properties. The two groups of volatile aluminum compounds are the aluminum trialkyls and the aluminum trialcoholates.

The aluminum trialcoholates (general formula $$Al(OR)_3$$

R being alkyl or aralkyl radical) are volatile enough so that they can be distilled. They are commercially available. These compounds contain oxygen as an integral part of the molecule and decompose under the influence of heat to yield alumina.

The invention will be more clearly understood from the following description wherein one embodiment of the apparatus is illustrated.

In the drawings:

FIGURE 1 is a diagrammatic view in elevation of an apparatus useful in carrying out the gas plating of alumina;

FIGURE 2 is a pictorial view of a quartz tube having a gas plated film of alumina thereon; and FIGURE 3 is a view in cross-section of the tube shown in FIGURE 2, and taken on line 3—3 of FIGURE 2 and looking in the direction of the arrows.

Referring to the drawings in more detail, reference character 1 is a glass-walled cabinet which is suitably supported on a table 2, and the gas plating apparatus arranged thereon as a closed system or train as illustrated in FIGURE 1 of the drawings.

The gas plating apparatus illustrated comprises a vaporizer 4 in which the aluminum compound is vaporized, e.g., aluminum ethoxide. Heating of the vaporizer 4 is obtained by means of an electric heating jacket 5, the intensity of the electrical circuit to the jacket being suitably regulated by the rheostat 6. Carrier gas stored in a tank 7 is admitted into line 8 through a valve 9. A drier 10, comprising a container filled with drying agent such as calcium or magnesium chloride, is connected into the line 8 to dry the carrier gas before it is introduced into the vaporizer 4.

The vaporizer 4 is connected to a quartz tube 12 which is suitably supported on stands 13. Tube 12 is provided with a heating jacket 15 containing a viewing window 16. Heat is supplied through the jacket 15 and such as may comprise an asbestos fiber, felt or blanket arranged about the tube and around which is wound a Nichrome electrical resistance heating coil 17, the same being connected to a source of electricity.

A manometer 18 in exit line 19 from the quartz tube 12 is provided to measure the gaseous pressure in the plating tube. Electrical resistance strip heaters 20 are arranged in the cabinet to maintain the desired heated atmospheric conditions during gas plating. If desired, heated air may be circulated to the cabinet or closure, the temperature being indicated by a thermometer 21 hung in the cabinet.

A potentiometer 30 is used to determine the temperature of the quartz tube 12 which is to be plated with alumina. A rheostat 31 controls the intensity of the heating applied to the electric heater coil 17.

A vacuum pump 33, which is suitably driven by a motor 34, is connected through pipe lines 36, 37 and Dry Ice container traps 38 and 39 to the exit line 19. A manometer 40 is provided in line 37 to measure the flow of exhaust gases from the system. A cut-off valve 42 is provided in a branch line 43 for exhausting the system to the atmosphere.

In carrying out the gas plating quartz tubes such as illustrated at 45 are given a uniform coating of alumina, as at 46, on the inner wall as shown on enlarged scale in FIGURES 2 and 3.

The method of gas plating coating of alumina in accordance with this invention is exemplified in the following example.

EXAMPLE I

Crystals of aluminum ethoxide were placed in the vaporizer container and heated to redness 900° F. and drawn through the system with nitrogen carrier gas using approximately 1:1 ratio by volume of nitrogen and aluminum ethoxide respectively. The system registers 10 mm. pressure. A quartz tube (½" inside diameter) heated to 1000° F. was plated on the inside with alumina. A good deposit was obtained when the nitrogen gas mixture was flowed at the rate of 200 cc. per minute through the system, and at reduced pressure conditions of 7.5 mm. Hg.

EXAMPLE II

Example I was repeated using air containing 5% water vapor in place of nitrogen as the carrier gas. The quartz tube was heated to 1000° F. and a deposit of alumina was obtained. When the temperature of the gas plating was carried out at 1200° F. a deposit of $Al_2O_3$ was obtained but the particles of alumina were somewhat larger.

EXAMPLE III

In this example the carrier gas used was hydrogen and the quartz plating tube heated to 1650° F. A thin translucent layer of alumina was deposited using aluminum tri-butylate vapor.

The following table lists the data of several runs and results obtained.

While generally the gas plating of alumina may be carried out at normal atmospheric pressure conditions, it is best conducted under reduced pressures ranging from 2.0 mm. to 30 mm./mercury, preferably at 7.0 to 7.5 mm./Hg pressure.

Gas plating of alumina employing aluminum ethoxide

*Table I*

EXPERIMENTAL DATA ON GAS PLATING OF ALUMINA ON QUARTZ

| Run No. | Temperatures, ° F. | | | Gases used as— | | Flow rates, cc./min. | | Vacuum, mm./Hg | Plating time, min. | Aluminum organometal compound used | Remarks |
|---|---|---|---|---|---|---|---|---|---|---|---|
| | Comp. vap. | Platg. tube | Heat box | Comp. carrier gas | Additive entrainment, 5% by vol. of carr. gas | Carr. | Entr. | | | | |
| 1 | 302 | 1,300 | | Pre-purified Nitrogen. | | 290 | | 7.0 | 20 | Al-triethylate. | Deposition of adherent translucent coating over 10% of the length of the heated quartz tube. |
| 2 | 302 | 1,100 | | do | | 290 | | 7.0 | 25 | do | Deposition over entire area of heated quartz tube. Adhesion not as good as run No. 1. |
| 3 | 302 | 1,200 | | do | | 290 | | 7.0 | 25 | do | As for run No. 2. |
| 4 | 410 | 1,650 | | do | | 255 | | 10.0 | 30 | do | Carbonaceous, nonadherent coating except 10% at center which was translucent and adherent. |
| 5 | 390 | 1,470 | | do | | 255 | | 10.0 | 30 | do | Thin translucent layer deposited over entire area of heated tube. Good adhesion. |
| 6 | 390 | 1,470 | | do | | 255 | | 10.0 | 30 | do | As for run No. 5. |
| 7 | 430 | 1,650 | | Hydrogen | | 400-625 | | 10-30.0 | 150 | do | Very thin translucent layer in center 10% of quartz heated area. Remainder is carbonaceous in nature. |
| 8 | 250 | 1,300 | | Air | | 340 | | 15.0 | 15 | do | Fair coating deposited in entire quartz heated area. Translucent. Good adhesion. |
| 9 | 430 | 1,200 | | do | | 420 | | 20.0 | 30 | do | As for run No. 8 except deposit is more granular. |
| 10 | 400 | 2,220 | 400 | do | | 80 | | 4.0 | 20 | do | Some white deposits. Poor adhesion. |
| 11 | 350 | 1,500 | 375 | do | Dry nitrogen and water vapor. | 250 | 55 | 7.0 | 30 | do | Slight dark coating. |
| 12 | 350 | 1,650 | 375 | do | do | 250 | 55 | 7.0 | 30 | Al-triisopropylate. | Do. |
| 13 | 350 | 1,300 | 375 | do | do | 50 | 30 | 5.0 | 30 | do | ½" transparent plate. Other parts partly translucent. |
| 14 | 350 | 900 | 375 | do | do | 50 | 30 | 5.0 | 30 | do | Thin translucent coating with poor adhesion. |
| 15 | 350 | 700 | 325 | do | do | 30 | 40 | 4.5 | 25 | do | Thin coating, better adhesion than in run No. 14. |
| 16 | 350 | 700 | 325 | do | Air and water vapor. | 30 | 40 | 4.5 | 12 | do | Good adhesion. Run stopped; trap frozen. |
| 17 | 350 | 700 | 325 | do | do | 15 | 100 | 5.5-6.0 | 30 | do | Good adhesion. |
| 18 | 150 | 752 | | Pre-purified nitrogen. | | | | 1.5 | 8 | Al-triisobutyl. | Bright aluminum coating in heated area which was oxidized with torch. |
| 19 | 167 | 842 | | do | | 10 | | 2.0 | 70 | do | Tube was coated and oxidized to alumina in four cycles. |
| 20 | 400 | 1,000 | 350 | Dry nitrogen. | Dry nitrogen and ammonia hydroxide vapor. | 200 | 200 | 7.0 | 30 | Al-triisopropylate. | Fair coating with good adhesion. Light tan color. |
| 21 | 350 | 1,050 | 300 | do | do | 200 | 250 | 7.5 | 30 | do | Fair coating with good adhesion, light tan color in ½ of length, other parts clear. |
| 22 | 350 | 1,050 | 300 | do | do | 40 | 750 | 10.5 | 30 | do | Slight crystal coating, translucent, poor adhesion. |
| 23 | 350 | 1,050 | 350 | do | do | 80 | 100 | 5.0 | 30 | do | Good coating, grey color, fair adhesion, translucent. |
| 24 | 375 | 700 | 350 | do | Air and water vapor. | 150 | 120 | 10.0 | 30 | Al-tri-sec-butylate. | Two small areas coated with crystals, poor adhesion. |
| 25 | 400 | 900 | 350 | do | Oxygen | 120 | 110 | 760 | 30 | do | Inlet of plating gases extended to reach into plating zone. Results as for run No. 14. |
| 26 | 425 | 850 | 350 | do | Air and water vapor. | 450 | 125 | 12.5 | 30 | do | Partly coated with dark crystals. |
| 27 | 450 | 900 | 350 | do | Dry nitrogen and ammonia hydroxide vapor. | 200 | 200 | 6.5 | 30 | do | Fair crystal coating. Light brown color. |
| 28 | 450 | 1,500 | 400 | do | do | 200 | 200 | 6.5 | 30 | do | Slight black coating with good adhesion. One inch at inlet side translucent with poor adhesion. |
| 29 | 475 | 1,200 | 375 | do | do | 200 | 200 | 6.5 | 30 | do | As for run No. 28. |
| 30 | 450 | 1,100 | 400 | do | do | 200 | 200 | 6.5 | 30 | do | Do. |

$Al(OC_2H_5)_3$ was made using different carrier gases as set out in the following table:

*Table II*

GAS PLATING OF ALUMINA FROM ALUMINUM ETHOXIDE ONTO THE INTERIOR OF ONE-HALF INCH DIAMETER HOLLOW QUARTZ TUBE

| Run No. | Vaporizer temp., ° C. | Carrier gas | Carrier gas, cc./min. | Plating temp., ° C. | Vacuum, mm./Hg | Plating time, minutes | Remarks |
|---|---|---|---|---|---|---|---|
| 1 | 150 | Pre-purified nitrogen. | 290 | 700 | 7 | 20 | Deposition of adherent, translucent alumina over approximately 10% of the length of heated quartz tube area. |
| 2 | 150 | do | 290 | 600 | 7 | 25 | Deposition over entire area of heated quartz tube. Adhesion poor. |
| 3 | 150 | do | 290 | 650 | 7 | 25 | As for run No. 2. |
| 4 | 210 | do | 255 | 900 | 10 | 30 | Deposition over entire area of heated quartz tube. Deposit carbonaceous and non-adherent except center 10% of heated area which was translucent and adherent. |
| 5 | 200 | do | 255 | 800 | 10 | 30 | Thin alumina layer deposited over entire area of heated quartz tube. Good adhesion. |
| 6 | 200 | do | 255 | 800 | 10 | 30 | As for run No. 5. |
| 7 | 220 | Hydrogen | 400-625 | 900 | 10-30 | 150 | Very thin alumina layer deposited in center 10% of quartz heated area. Remainder is carbonaceous in nature. |
| 8 | 120 | Air | 340 | 700 | 15 | 15 | Fair coating deposited in entire quartz heated area. Translucent. Good adhesion. |
| 9 | 220 | do | 420 | 650 | 20 | 30 | As for run No. 8 except deposit is more granular. |

The ratio of carrier and entrained metal bearing gas may vary from 1:1 to 6:1 or higher without effect except that a longer time is required to deposit alumina using a lower concentration of metal organo vapors.

As addition agents to modify the carrier and improve the adhesion properties of the gas plated alumina deposit, other substances and mixtures were used with various degrees of success. For example, runs were made using aluminum tri-isopropylate as the gas plating aluminum organo compound and as a carrier gas the following: dry nitrogen, dry air, air containing water vapor and admixtures comprising the carrier gas to which is added 1 to 10% by volume of an addition agent as aforementioned. Such addition agents modify the deposit and in general producing a brighter deposit with increased uniformity and luster.

Various mixtures used as the carrier gas and addition agent comprises dry nitrogen with ammonia hydroxide vapor; air (dry) and (moist) and modified by the addition of glacial acetic acid vapors, hydrogen chloride with and without water vapor being present. Some improvement was found in the deposit when using dry nitrogen carrier gas admixed with 5% by volume of nitric oxide. Using a carrier gas consisting of air containing water vapor and sulfur dioxide (1%) when gas plated at 1000° F. resulted in a dark coating with small areas fused to the quartz substrate. In general it was noted that the adhesion of the deposit was not as good in the presence of sulfur dioxide.

Gas plating carried out as described at a plating temperature of 1000° F. using air as the carrier gas admixed with (*a*) methyl bromide; (*b*) methyl bromide and water vapor; (*c*) monomethyl amine; and (*d*) air plus water vapor; (*e*) monomethyl amine alone; (*f*) dimethylamine and air containing water vapor and (*g*) trimethylamine indicate that while the uniformity of the deposit over the entire area contacted is achieved there is little improvement noted in the adhesion characteristics over the use of dry air alone. The presence of water vapor helps to lower the decomposition temperature of the aluminum-organo compound.

As the aluminum organo compound useful in the gas plating process, the aluminum alcoholates may be used as tri-isopropylate. For each compound there is a certain temperature at which heat decomposition takes place accompanied by the deposition of alumina.

The gaseous metal compound contains oxygen which is apparently released during heat-decomposition resulting in the metal oxide deposit.

In the use of aluminum tri-ethylate as the plating gas, it was found, in general, that best results were obtained when plated at 1500° F. and above. A similar observance was noted using aluminum tri-isopropylate, although in this case the decomposition temperature is in the neighborhood of 700° F. in the presence of water vapor.

The addition of water vapor in the carrier gas, in general, tends to promote the formation of alumina. The use of air instead of nitrogen as a carrier gas for the water vapor did not increase the amount of decomposition as might be expected.

Alumina films deposited using aluminum tri-isobutyl with nitrogen with water vapor when allowed to cool in air from temperatures of 1500° F. showed approximately 50% of the aluminum film deposit had oxidized to alumina. Due to adhesion difficulties it is preferred to form the alumina deposit in situ in the gas plating chamber. Aluminum organo compounds are now commercially produced and marketed. Aluminum isopropylate being available from Harshaw Chemical Company, of Cleveland, Ohio. Aluminum ethoxide $[Al(OC_2H_5)_3]$ contains 63.19% aluminum oxide; melting point 140° C., appearance white powder and a boiling point of 200° C. at 6–8 mm. Hg pressure. Aluminum ethoxide vapor at temperature greater than 200° C. and less than about 30 mm. Hg pressure has been found to be safely compatible with purified hydrogen, nitrogen, as well as air.

Gas plating made using air as the carrier gas with aluminum organo compounds, and wherein the gas flowed at rates from 80 cc./min. to 1080 cc./min., produced a thin translucent alumina deposit at 1200° F. When the plating was carried at somewhat higher temperature (approximately 1300° F.) the deposit of alumina was smoother and more uniform and evenly deposited on the surface of the substrate. When the gas plating temperature is raised upwards of 2200–2300° F., the deposit is unsatisfactory being non-adherent.

Using aluminum tri-isopropylate as the plating compound and using water vapor with nitrogen as the carrier gas, plating was obtained at 900° F. The plating temperature was able to be still lowered (to 700° F.) when air containing water vapor was substituted for nitrogen as the carrier gas for the aluminum tri-isopropylate vapors.

The water vapor was introduced by bubbling a metered stream of the carrier gas, e.g. nitrogen, through a tube of water held at room temperature (70° F.).

Employing the highly branched aluminum organo compounds tri-sec-butylate for example, the temperature for effecting gas plating ranges from 900° F. to 1500° F. Best results were obtained at 1000° F.

Gas plated deposits containing alumina 76%, silice 14%, volatile 10% were obtained using aluminum tri-sec-butylate at 1000° F., with nitrogen and ammonia vapor as carrier gas. Volatile is readily removed by heating the plate above 1000° F. Such a product then analyzes alumina 85% and silica 15%. Prior to annealing adhesion was not satisfactory.

It has been found that a vapor deposited alumina plate can be obtained with aluminum triethylate at temperatures as low as 1470° F.; with aluminum tri-isopropylate at 700° F., and with the aluminum tri-sec-butylate at 900° F. The most satisfactory plating was obtained in each case at about 100° F. above the minimum plating temperature. A thin translucent plate was obtained.

While the invention has been described with more particularity relative to alumina, the process is applicable to the gas plating of other refractory oxides and carbides, and as may be desired for coating quartz or refractory glass materials such as in the making of semi-conductor materials and the like. The invention is particularly useful in gas plating deposits on the interior of hollow, cylindrical tubes made of quartz, refractory glass, e.g., borosilicate glasses and the like, and wherein alumina organometallic vapor is used as a heat decomposable gas.

What is claimed is:

1. A process for gas plating alumina on a refractory silica substrate material, said process consisting of heating the substrate to be plated with alumina to a temperature of 1200° F. which thermally decomposes a heat-decomposable gaseous organo compound of aluminum brought in contact therewith, and contacting the thus heated silica substrate material with said gaseous compound of aluminum in the presence of an oxidizing atmosphere consisting of air containing 1 to 10% by volume of water vapor, and whereby the gaseous organo compound of aluminum is decomposed and aluminum oxide deposited on the surface of said refractory silica substrate, said gaseous organo compound of aluminum being an aluminum alcoholate.

2. A process for gas plating alumina on a refractory silica substrate material, said process consisting of heating the substrate to be plated with alumina to a temperature of about 1000° F. which thermally decomposes a heat-decomposable gaseous organo compound of aluminum brought in contact therewith, and contacting the thus heated silica substrate material with said gaseous compound of aluminum in the presence of an oxidizing atmosphere consisting of air containing 5% by volume of water vapor, and whereby the gaseous organo compound of aluminum is decomposed and aluminum oxide deposited on the surface of said refractory silica substrate, said gaseous organo compound of aluminum being an aluminum ethoxide.

References Cited in the file of this patent

UNITED STATES PATENTS

| | | |
|---|---|---|
| 2,612,442 | Goetzel | Sept. 30, 1952 |
| 2,619,433 | Davis et al. | Nov. 25, 1952 |
| 2,694,377 | Pawlyk | Nov. 16, 1954 |
| 2,772,654 | Herkart | Dec. 4, 1956 |
| 2,784,115 | Brinsmaid et al. | Mar. 5, 1957 |
| 2,824,828 | Homer et al. | Feb. 25, 1958 |
| 2,831,780 | Deyrup | Apr. 22, 1958 |
| 2,847,320 | Bulloff | Aug. 12, 1958 |
| 2,972,555 | Deutscher | Feb. 21, 1961 |